United States Patent
El-Sayed

(10) Patent No.: US 7,633,733 B1
(45) Date of Patent: Dec. 15, 2009

(54) SHORT CIRCUIT DETECTOR FOR FIELDBUS CABLE SYSTEM NETWORK

(75) Inventor: Hassan M. El-Sayed, Manchester (GB)

(73) Assignee: Moore Industries International, Inc., Sepulveda, CA (US)

( * ) Notice: Subject to any disclaimer, the term of this patent is extended or adjusted under 35 U.S.C. 154(b) by 589 days.

(21) Appl. No.: 11/206,438

(22) Filed: Aug. 18, 2005

(51) Int. Cl.
*H02H 3/08* (2006.01)
(52) U.S. Cl. ...................................... 361/93.1
(58) Field of Classification Search ................. 361/93.1
See application file for complete search history.

(56) References Cited

U.S. PATENT DOCUMENTS

| | | | | |
|---|---|---|---|---|
| 3,909,677 | A | * | 9/1975 | McClain ........................ 361/67 |
| 5,594,384 | A | * | 1/1997 | Carroll et al. ................ 329/369 |
| 5,835,534 | A | * | 11/1998 | Kogure ........................ 375/257 |
| 6,369,997 | B2 | * | 4/2002 | Graube ........................ 361/93.9 |
| 6,870,722 | B2 | | 3/2005 | Strauser ...................... 361/93.9 |
| 6,912,671 | B2 | | 6/2005 | Christensen ................... 714/25 |
| 7,079,365 | B2 | * | 7/2006 | Brown et al. .................. 361/42 |
| 2005/0104734 | A1 | * | 5/2005 | Graube ........................ 340/650 |

FOREIGN PATENT DOCUMENTS

GB       2317707 A   *   4/1998

* cited by examiner

*Primary Examiner*—Stephen W Jackson
*Assistant Examiner*—Ann T Hoang
(74) *Attorney, Agent, or Firm*—Orrick, Herrington & Sutcliffe, LLP

(57) ABSTRACT

A power supply adapted to provide power for one or more field devices over a protocol bus based network, such as a fieldbus network, which includes an oscillator circuit and a power control switch mounted at the output of a conditioned power supply. The oscillator circuit is adapted to detect a cable fault such as a short circuit. When a cable fault is detected, the oscillator circuit sends a signal to the power control switch to stop the power supply from feeding current to the network and to activate an alarm signal to alert a host of the cable fault.

10 Claims, 3 Drawing Sheets

SHORT CIRCUIT DETECTOR FOR FIELDBUS CABLE SYSTEM NETWORK

BACKGROUND

1. Field of the Invention

The present invention relates to a method and apparatus for detecting cable faults in a network such as a fieldbus network.

2. Description of the Related Art

A fieldbus network is a two-wire network capable of delivering DC power and bidirectional digital communications to remotely mounted field devices. The digital communications are typically carried on a 31.25 kHz carrier signal in the standard defined fieldbus network. Fieldbus networks are advantageously used in industrial control systems and particularly in control systems that provide distributed control incorporating field devices having local processors. Various field devices might be attached to be powered from and communicate over the network, including controllers, actuators and sensors. Multiple field devices can be attached to one fieldbus segment. The fieldbus is typically implemented on the physical level as two wire shielded cable. More details can be found in the International Electrotechnical Commission standard IEC 61158-2 which is specifically for industrial networks and promoted by Foundation Fieldbus and PROFIBUS organizations.

Fieldbus power supplies differ from conventional power supplies in that fieldbus power supplies include extra components to keep fieldbus communication signals from being fed into and interfering with the power supply. Thus, fieldbus power supplies include conditioning circuitry, often in the form of series inductors, to isolate the regulated DC power supply from the AC component used for communication across the network.

According to the IEC 61158-2 standard, a fieldbus segment can have an overall cable length of up to 1900 meters. The standard states that each fieldbus segment can power up to a maximum of thirty-two field devices and those devices are attached in parallel across the two-wire fieldbus network. The input impedance of any field device according to the standard is no less than 3 k$\Omega$. Therefore, the total equivalent input impedance of field devices per segment can be below 100$\Omega$. On the other hand, the typical loop resistance of a type A fieldbus cable, such as those made by Kerpenwerk GmbH, is 45 $\Omega$/kM for Foundation Fieldbus or PA applications and 110 $\Omega$/kM for DP PROFIBUS applications. Therefore, the cable loop resistance can be as high as 100$\Omega$ or 220$\Omega$ for the approximately two kilometer allowable segment length for networks configured according to the standard.

If a short circuit occurs at the far end of a standard fieldbus network cable, the conditioned power supply will continue feeding current to the load, because the cable loop resistance seen by the conditioned power supply is approximately equivalent to a fully loaded fieldbus segment. Under these circumstances, the power supply cannot differentiate between a true load and a cable fault on the basis of the current drawn, because the current drawn does not exceed the threshold value set by the power supply specification. For instance, a 24 V DC conditioned power supply can deliver up to 350 mA as maximum current per segment. If there are eight field devices attached to a fieldbus segment having a length 1500 meters, the cable loop resistance will be 75$\Omega$. Each field device draws 20 mA, so the total current drawn from the system is 160 mA. Should a cable fault occur at the far end of the cable, the drawn current will be 24 V$\div$75$\Omega$=320 mA, which is below the threshold value. Therefore, the power supply reports no failure.

Conditioned power supplies, whether isolated or nonisolated, are typically equipped with electronic short circuit protection. These circuits are not designed to detect cable faults over a long cable. For a short cable, the loop resistance allows the power supply to output current above the threshold value. The protective circuitry built-in inside the power supply will limit the drawn current. Other types of power supplies will continue to output current at full capacity. If a conditioned power supply fails to detect the cable fault, it can corrupt the communication signals on the fieldbus network. It may also cause damage to the power supply modules because of the excessive heat generated as a result of high inrush current or spiky noise switching signals generated by the DC/DC converter are fed back into the system via the DC bus.

U.S. Pat. No. 6,912,671 describes wiring fault detection that measures and diagnoses transmitted protocol signals over a fieldbus network. This measurement is performed at the controller side, that is, wiring connects the controller to the conditioned power supply and then the cable of the fieldbus network is connected from the conditioned power supply to the field devices. In this configuration the controller makes its measurements through the conditioned power supply. In intrinsically safe applications, the wiring that carries transmitted signals is physically isolated from the field side which powers the field devices. If a cable short circuit occurs on the field side in such an intrinsically safe application, the '671 patent technique cannot detect the fault on the field side because it is isolated from the fieldbus network by the front-end transformer of the conditioned power supply. Because of its configuration, the '671 patent technique can detect a cable short circuit between the controller and the conditioned power supply, but not in the fieldbus network cable. In addition, the '671 patent technique is not compatible with detecting a cable fault when communication signals are present on the fieldbus network.

When a cable fault occurs in these conventional configurations, network signal integrity may be lost but the conditioned power supply electronics continue to indicate that no cable fault has occurred. No alarm is reported or sent to alert the user or the host. Such faults are difficult to resolve and to locate within a network. Moreover, the nature of the fault may be misunderstood, leading to further delay. Here, the cable is faulty but because the power supply cannot detect this type of fault, the power supply may erroneously be considered faulty and need to be verified, which is undesirable.

SUMMARY OF THE PREFERRED EMBODIMENTS

A preferred aspect of the present invention provides a power supply circuit adapted to provide DC power over a connected network that carries digital communications. The power supply circuit includes a conditioned DC power supply block conditioned to limit coupling of a communications signal from a connected network into the conditioned DC power supply block. The conditioned DC power supply block is coupled to an output terminal to which a network can be connected. An oscillator circuit coupled to an output of the conditioned DC power supply and to the output terminal has changed operating characteristics when a network connected to the output terminal has a cable short circuit. A detector is coupled to the oscillator circuit to detect a change in an operating condition of the oscillator circuit responsive to a cable short circuit in a connected network and to output a detector signal responsive to the change in the operation condition of the oscillator circuit. A switch coupled to the detector and to the conditioned power supply causes the conditioned power supply to suspend supplying current to the output terminal in response to the detector signal.

In a particularly preferred implementation, the power supply circuit is adapted for providing power to a fieldbus network.

BRIEF DESCRIPTION OF THE DRAWINGS

Aspects of the present invention are illustrated in the attached drawings and can be better understood by reference to those drawings in conjunction with the detailed description. The attached drawings form a part of the disclosure.

DETAILED DESCRIPTION OF THE PREFERRED EMBODIMENTS

Preferred implementations of the present invention include a fieldbus power supply adapted to provide power for one or more field devices over a protocol bus based network such as a fieldbus network. A preferred fieldbus power supply includes a conditioned power supply block, an oscillator circuit and a power control switch coupled to the conditioned power supply block. The oscillator circuit is adapted to detect a cable fault such as a short circuit on a connected fieldbus or similar network. When a cable fault is detected, the oscillator circuit causes a power control switch to stop the fieldbus power supply from feeding current to the network. Most preferably, the oscillator also activates an alarm signal to alert a host of the cable fault when a cable fault is detected.

Preferred embodiments of the present invention provide electronic circuits capable of detecting an electrical short circuit along a fieldbus network using a frequency oscillation circuit. Most preferably the short circuit detecting circuit also can prevent the conditioned power supply from feeding current to the load of the fieldbus network, for example, by causing the power control switch to be switched off. In some particularly preferred embodiments, the frequency oscillation circuit preferably also activates a remote alarm optically connected to the host system in response to detecting the short circuit or other cable fault.

Figure 1:
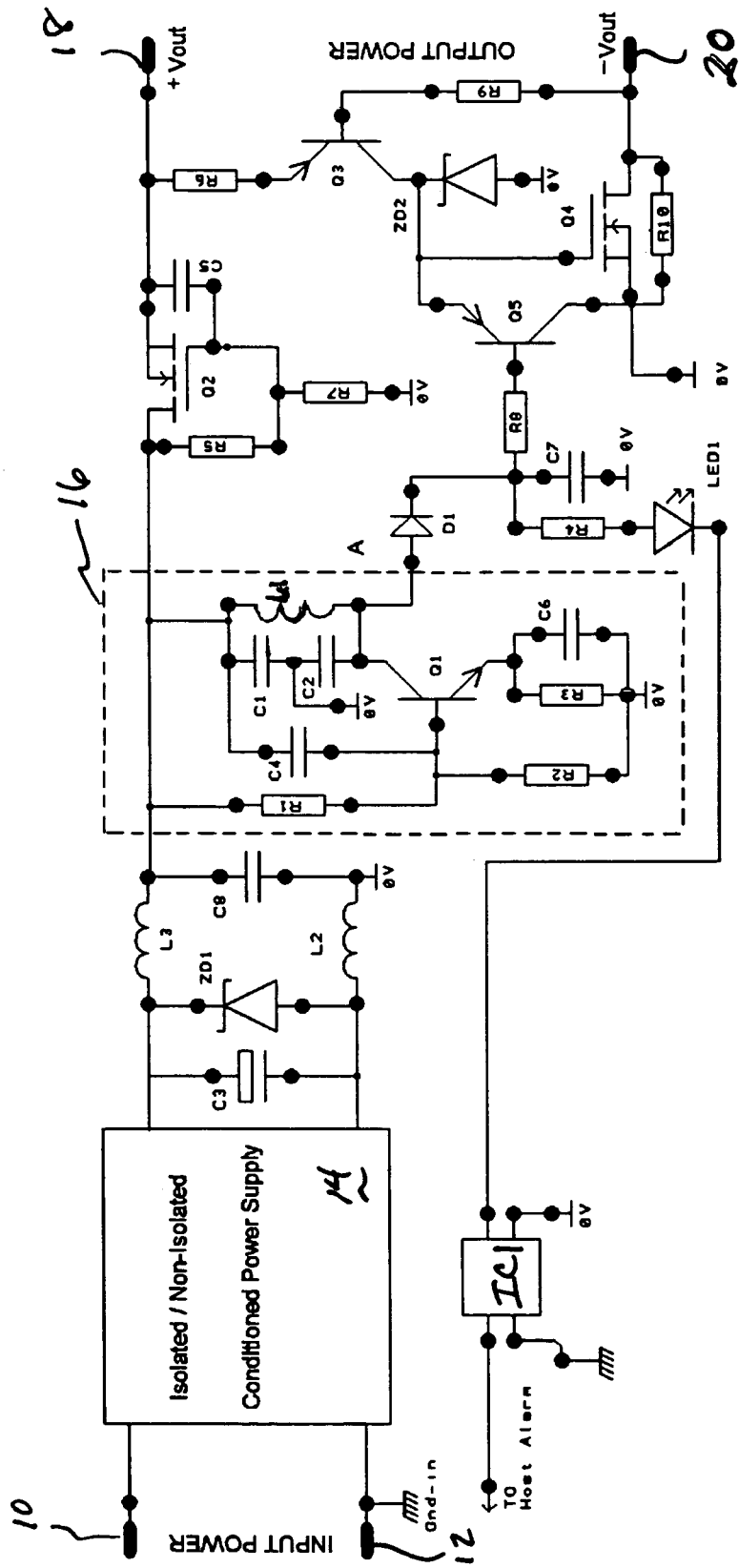
FIG. 1 illustrates aspects of a preferred fieldbus power supply in accordance with the present invention.

FIG. 1 shows an implementation of a fieldbus power supply incorporating preferred aspects of the present invention. Input power is fed over inputs 10, 12 to an isolated dc/dc converter or non-isolated power supply block 14. The power supply block 14 is conditioned on its output side by providing 5 mH conditioning inductors (coils) in accordance with the IEC61158-2 standard which dictates standardized configurations of fieldbus networks. The output voltage of the conditioned power supply block 14 is further filtered by additional L2 and L3 inductors, as shown in FIG. 1, to remove noise that might be generated by the dc/dc converter. The illustrated L2 and L3 inductors are especially preferred when an isolated, conditioned power supply is used for the power supply block 14 of the FIG. 1 fieldbus power supply.

As discussed above, fieldbus networks are characterized in that they provide DC power to attached field devices, such as controllers, actuators and sensors, and carry bidirectional digital communications between a system controller and the various field devices attached to the network segment. The digital communications are carried by an AC carrier that is, in many circumstances, a 31.25 kHz carrier signal as defined by the IEC 61158-2 standard. Because of the power and communication nature of the preferred fieldbus network environment, preferred fieldbus power supplies provide conditioning to avoid communication signals from coupling into the DC power supply block. Particularly preferred implementations of the power supply with cable fault detection of the present invention can be implemented in Foundation Fieldbus and PROFIBUS types of networks. Additional information regarding applications and configurations of advantageous fieldbus networks can be found at the websites and in the publications of the Foundation Fieldbus and PROFIBUS organizations. Of course, successors to the present implementations of the standards and networks are anticipated and the present invention will find application in such networks.

Still referring to FIG. 1, the dashed box 16 indicates a preferred high frequency oscillator used by the FIG. 1 fieldbus power supply for detecting cable short circuits or other cable faults according to preferred aspects of the present invention. FIG. 1 illustrates a Colpitts oscillator as the oscillator 16, but the oscillator 16 could be any kind of oscillator. The filtered DC voltage powers the oscillator 16 and outputs power through the terminals 18, 20. The oscillator 16 is positioned to the fieldbus network side of the FIG. 1 conditioned power supply block 14, so that the conditioning inductors of the power supply block 14 and the additional inductors L2 and L3 are not in the circuit path of the oscillator 16. Most preferably the inductors L2, L3 and the capacitor C8, and the conditioning circuitry prevent the oscillator 16 output from feeding back into the conditioned power supply block 14 and from feeding forward into the fieldbus network.

The resonant operating frequency ($f_o$) of the signal of the oscillator 16 is determined by three components, series connected capacitors C1 and C2, which have a tap coupled to a reference voltage between them, and L1 which is in parallel with capacitors C1 and C2. The resonant operating frequency ($f_o$) can be represented by the following equation:

$$f_0 = \frac{1}{2\pi\sqrt{L_1 \cdot \left(\frac{C_1 \cdot C_2}{C_1 + C_2}\right)}}$$

Figure 2:
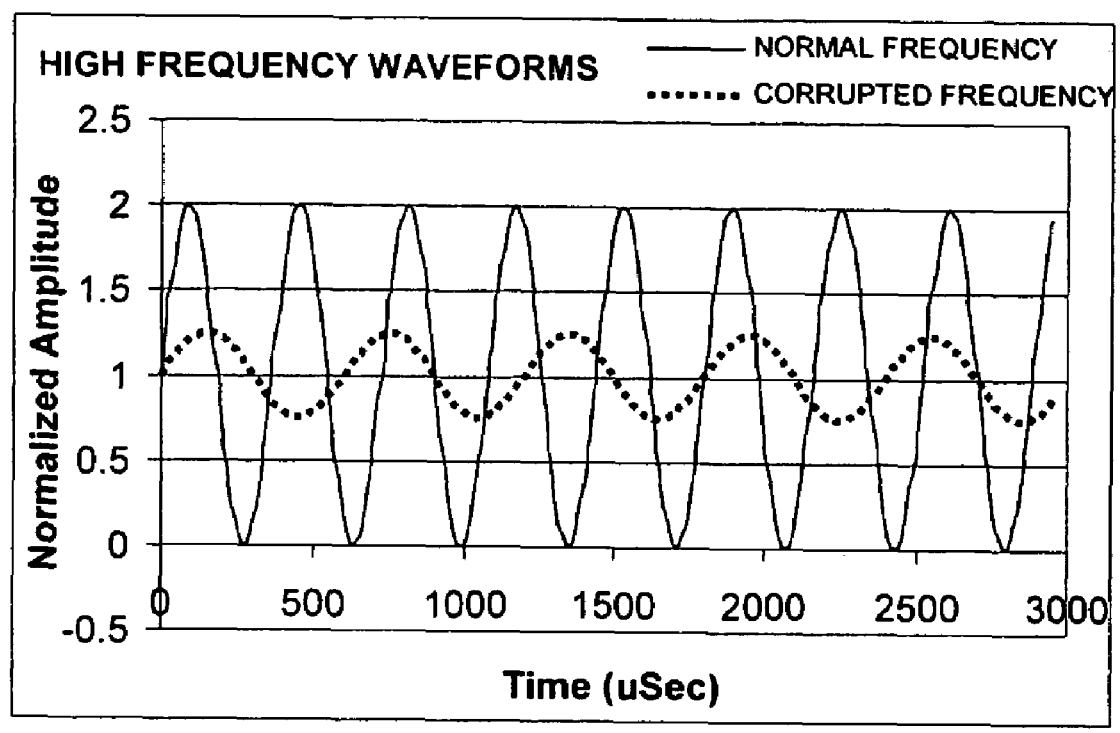
FIG. 2 schematically illustrates a signal generated by an oscillator circuit within the FIG. 1 fieldbus power supply.

C1, C2 and L1 form part of an oscillator circuit where one side of the oscillator is fed into the base of the transistor Q1 via the capacitor C4 to amplify the oscillator waveform. Resistors R1 and R2 provide a DC bias to the base of bipolar transistor Q1 DC. The waveform generated at node A of FIG. 1, at the input to diode D1, is shown in FIG. 2.

The waveform output by the oscillator 16 at node A of FIG. 1 is then fed into a positive peak detector including diode D1 and capacitor C7 to convert the oscillator 16 output at node A into a DC signal. The DC power is input to light emitting diode LED 1, which acts as an indicator to inform the user that the condition of the output voltage Vout at terminals 18, 20 is stable. In this state of normal, no connected cable fault operation, the output of IC1 is low and no alarm is sent from IC1 to the host. An alarm is only activated and sent by IC1 of the FIG. 1 fieldbus power supply when light emitting diode LED1 loses power from the DC signal. As shown in FIG. 1, alarms are issued by IC1 in response to a detected cable fault such as a cable short circuit that causes a peak DC voltage at the input to LED 1 to drop below a threshold level defined primarily by the characteristics of diode D1. Most preferably, IC1 is isolated from a host controller through conventional optical isolation techniques.

Transistor Q5 is controlled by the DC signal generated by diode D1 and capacitor C7 from node A and coupled through resistor R8 to the base of bipolar transistor Q5. In normal operation, transistor Q5 is switched off, and stays off as long as the normal level DC signal is present at the base of bipolar transistor Q5. When the DC signal falls to a low level, transistor Q5 switches on and pulls down the Vref which causes field effect transistor Q4 to switch off and go open circuit (i.e., very high resistance), which stops current from flowing to the fieldbus network connected to terminals 18, 20. The DC signal only falls to a low level if the frequency output of oscillator 16 falls considerably from its normal, no fault state. Frequency output is lost when there is an electronic component fault in the fieldbus power supply of FIG. 1 or when there is a cable short circuit fault in the fieldbus network.

In normal operation, when there is no cable short circuit, the voltage output Vo is buffered by transistor Q2. Buffering the oscillator 16 from the network in this way avoids loading the network with the oscillator 16 and detector circuitry, which could undesirably attenuate the digital communication signals on the fieldbus network wiring. Transistor Q3 is normally switched on to generate Vref and enables transistor Q4 to be conductive. Transistor Q4 thus acts as a power supply control switch in that it switches off to prevent current from flowing from the fieldbus power supply to the connected network when there is a detected cable fault such as a short circuit. Q4 is on for normal operation when current flows from the fieldbus power supply to the connected fieldbus network.

Figure 3:
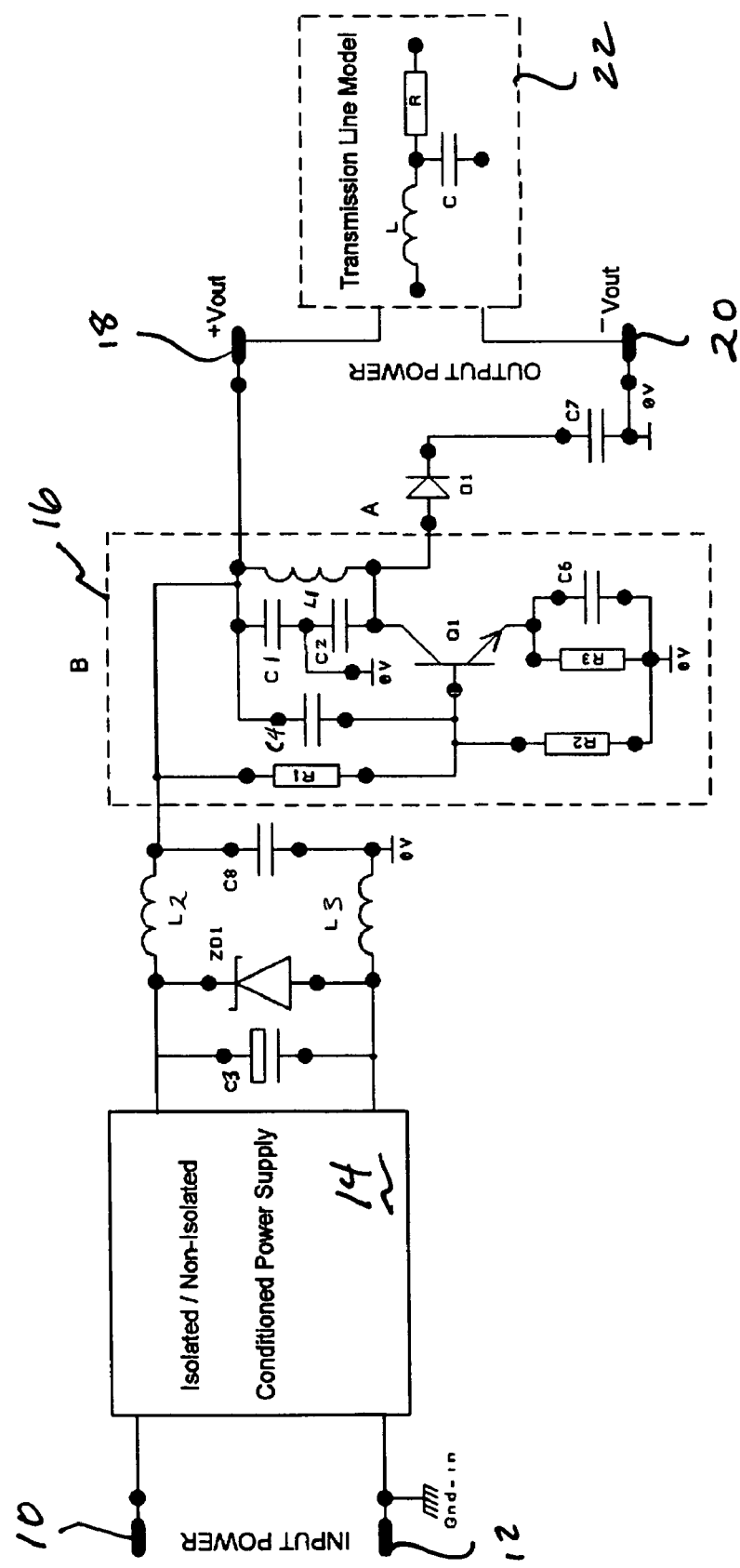
FIG. 3 schematically illustrates a fieldbus power supply consistent with the FIG. 1 circuit coupled to a fieldbus network, with the fieldbus network represented by a transmission line model.

In normal operation with the FIG. 1 fieldbus power supply connected to a fault-free network, the oscillator circuit 16 outputs a sinusoidal waveform signal generally like that shown in FIG. 2. In this normal operating state, light emitting diode LED1 is on, IC1 and Q5 are off, and transistors Q2, Q3 and Q4 are on. The output of the fieldbus power supply is connected through terminals 18 and 20 to a fieldbus network that may include a cable having a length of between about 10 meters to 1900 meters. If there is a cable fault due to a short circuit, irrespective of the cable length, the oscillator frequency will suddenly change to a different frequency in both phase and amplitude and sometimes may be completely attenuated due to the transmission line parameters. The corrupted signal at node A indicative of a cable fault is also indicated in FIG. 2. This reflects the fact that the characteristics of the network and the local oscillator have changed to an extent that the oscillation frequency has changed sufficiently to be away from the resonant frequency of the local oscillator. The cable of the fieldbus network can be modeled as a transmission line and so has the properties of inductance, capacitance and resistance. Generally speaking the fieldbus cable will be characterized by some values of inductance, loop resistance and capacitance, depending in part on the length of the cable. The equivalent circuit of transmission line can be represented as RLC circuit 22, as shown in FIG. 3. The frequency of the local oscillator 16 is influenced by the cable inductance, resistance and its capacitance of the connected fieldbus network. For simplicity, the cable parameters become the field load which in effect is in parallel with the tuned circuit, as can be seen in FIG. 3. Changes in the fieldbus network thus alter the local oscillator away from its resonant frequency.

When a cable fault such as a cable short circuit occurs, the oscillator 16 frequency changes in frequency and amplitude, which causes the DC signal derived from the node A oscillator signal to drop below a threshold value, primarily determined by diode D1, forcing both the light emitting diode LED1 to turn off and transistor Q5 to turn on. Transistor Q4 at the same time becomes an open circuit, because Vref goes to 0 V. Transistor Q3 switches off because the load current stops flowing through transistor Q4 and is instead diverted through resistor R10, which is most preferably a high value resistor. Transistor Q3 stays off as long as there is a cable short circuit fault in the network. When the cable fault is removed from the fieldbus network, transistor Q3 switches on because its base is pulled to 0 V via resistor R10, and the oscillator 16 restores its waveform and the rest of the fieldbus power supply circuit returns to normal operating conditions.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. A power supply module adapted to provide DC power over a connected network that carries digital communications, the power supply module comprising:

a conditioned DC power supply block adapted to limit coupling of a communications signal from a connected network into the conditioned DC power supply block, an output of the conditioned DC power supply block coupled to an output terminal of the power supply module, the output terminal adapted to connect to a network cable of a network, the output of the conditioned DC power supply block adapted for connection to a network cable of a network through the output terminal;

an oscillator circuit coupled between the output of the conditioned DC power supply block and the output terminal, the oscillator circuit coupled to the output terminal so that the oscillator circuit is capable of conductively connecting to a network cable connected to the output terminal, the oscillator circuit having changed operating characteristics when a network cable connected to the output terminal has a cable short circuit;

a detector coupled to the oscillator circuit to detect a change in the operating characteristics of the oscillator circuit responsive to a cable short circuit in a network cable connected to the output terminal and to output a detector signal responsive to the change in the operating characteristics of the oscillator circuit; and a switch coupled to the detector and to the conditioned DC power supply block, the switch connected in series between the conditioned DC power supply block and the output terminal, the switch suspending current flow from the conditioned DC power supply block to the output terminal in response to the detector signal and thereby preventing supplying current to a network cable connected to the output terminal at least while such a network cable has a cable short circuit.

2. The power supply module of claim 1, further comprising an alarm circuit coupled to the detector, the alarm circuit outputting an alarm signal responsive to the detector signal.

3. The power supply module of claim 2, wherein an output of the alarm circuit is optically isolated from the detector signal.

4. The power supply module of claim 1, wherein the connected network is a fieldbus network and the power supply module is adapted to provide power to the fieldbus network through the switch and the output terminal when the switch is in a conducting state.

5. The power supply module of claim 1, wherein the detector is a DC peak detector sampling an amplitude of an output signal from the oscillator circuit.

6. The power supply module of claim 1, wherein the change in the operating characteristics of the oscillator circuit is a change in a resonant frequency of the oscillator circuit.

7. The power supply module of claim 1, wherein the oscillator circuit is isolated from the conditioned DC power supply block by an inductor and a capacitor.

8. The power supply module of claim 1, wherein the oscillator circuit comprises first and second series connected capacitors, the series connected capacitors connected in parallel with an inductor between first and second terminals, the first terminal coupled to a positive terminal side of the output terminal and the second terminal coupled to a negative terminal side of the output terminal.

9. The power supply module of claim 1, wherein the oscillator circuit comprises a Colpitts oscillator.

10. The power supply module of claim 1, wherein the switch causes the conditioned DC power supply block to resume supplying current to the output terminal in response to the detector signal.

* * * * *